Patented Feb. 6, 1934

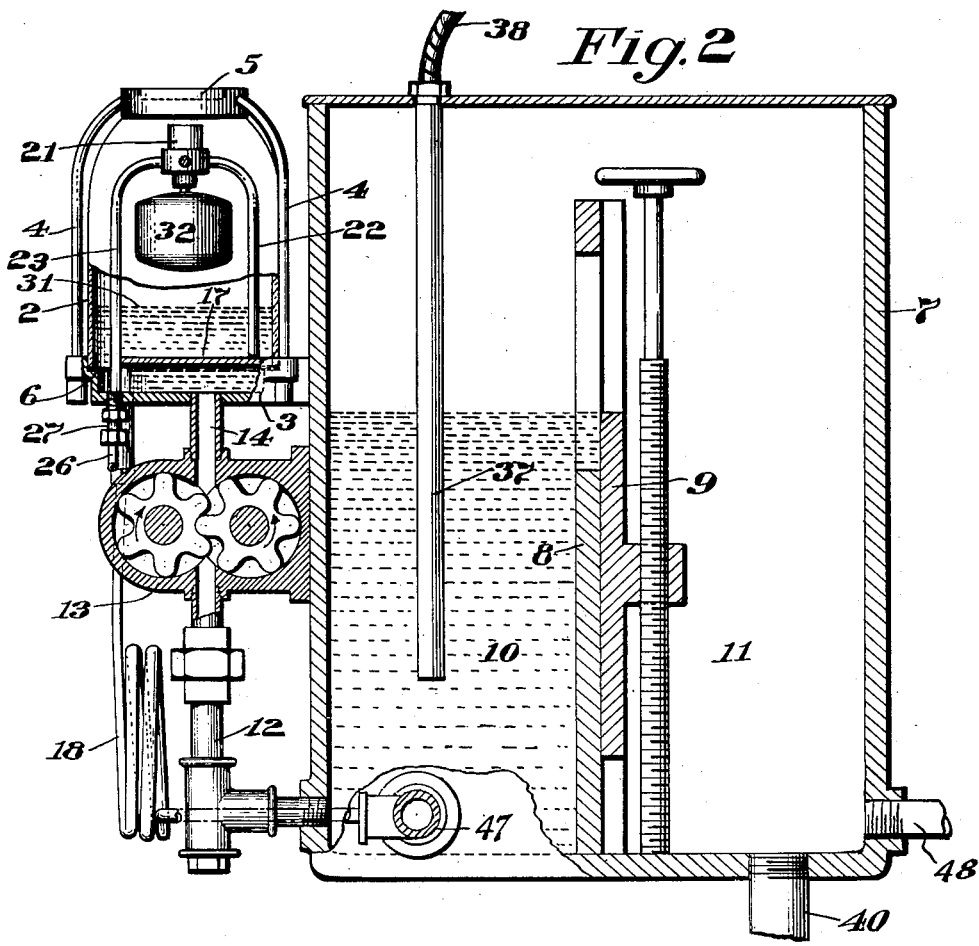
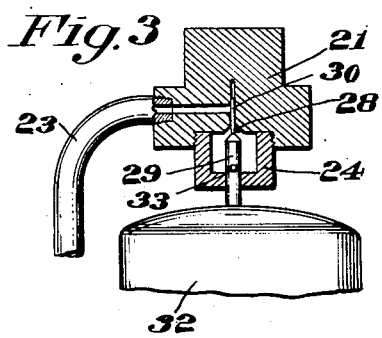
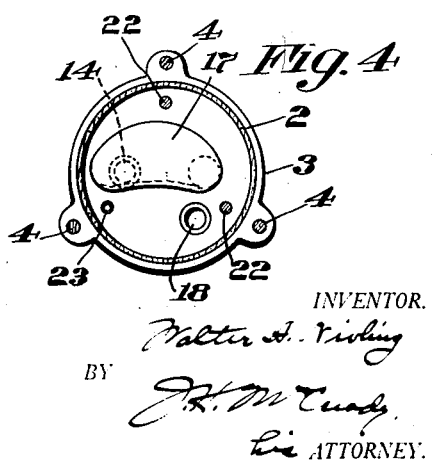

1,945,822

UNITED STATES PATENT OFFICE 1,945,822

METHOD AND APPARATUS FOR MEASURING VISCOSITY

Walter A. Nivling, Newton, Mass., assignor to The Automatic Appliance Company, a corporation of Missouri Application July 13, 1926, Serial No. 122,129
Renewed March 12, 1932

16 Claims. (Cl. 265—11)

This invention relates to methods and apparatus for giving a continuous indication or record of the viscosity of a liquid.

Under many circumstances it is important to measure the viscosity of a stream of liquid, and to indicate or record such measurement continuously so that variations in the viscosity can be detected and appropriate steps taken to compensate for or correct this condition. Such a determination is desirable, for example, in the operation of machines used in the textile industry for applying sizing to yarn, such machines being commonly known as "slashers". In a typical installation the sizing may be delivered either continuously or intermittently to the size or dip tanks, but it is prepared and delivered to the system in batches. It is important to keep the viscosity as uniform as possible, and a continuous measurement of the viscosity of the sizing in the machines affords a valuable check on the preparation of this material. An instrument for giving a continuous indication or record of the viscosity of a stream of liquid or of variations in viscosity in a body of liquid also is valuable for other purposes, as, for example, in the oil industry, and in many other relationships.

To devise a method of making these determinations and an apparatus for practising said method which will be reliable in operation and economical to manufacture, constitutes the chief object of the present invention.

The nature of the invention will be readily understood from the following description when read in connection with the accompanying drawings, and the novel features will be particularly pointed out in the appended claims.

In the drawings,

Fig. 2 is a vertical, cross-sectional view, partly in elevation, showing the supply tank, pump, trap, and adjacent parts;

Fig. 3 is a cross-sectional view, partly in elevation, of the safety valve which is located in the trap;

Fig. 4 is a horizontal cross-sectional view through the trap;

Figure 1:
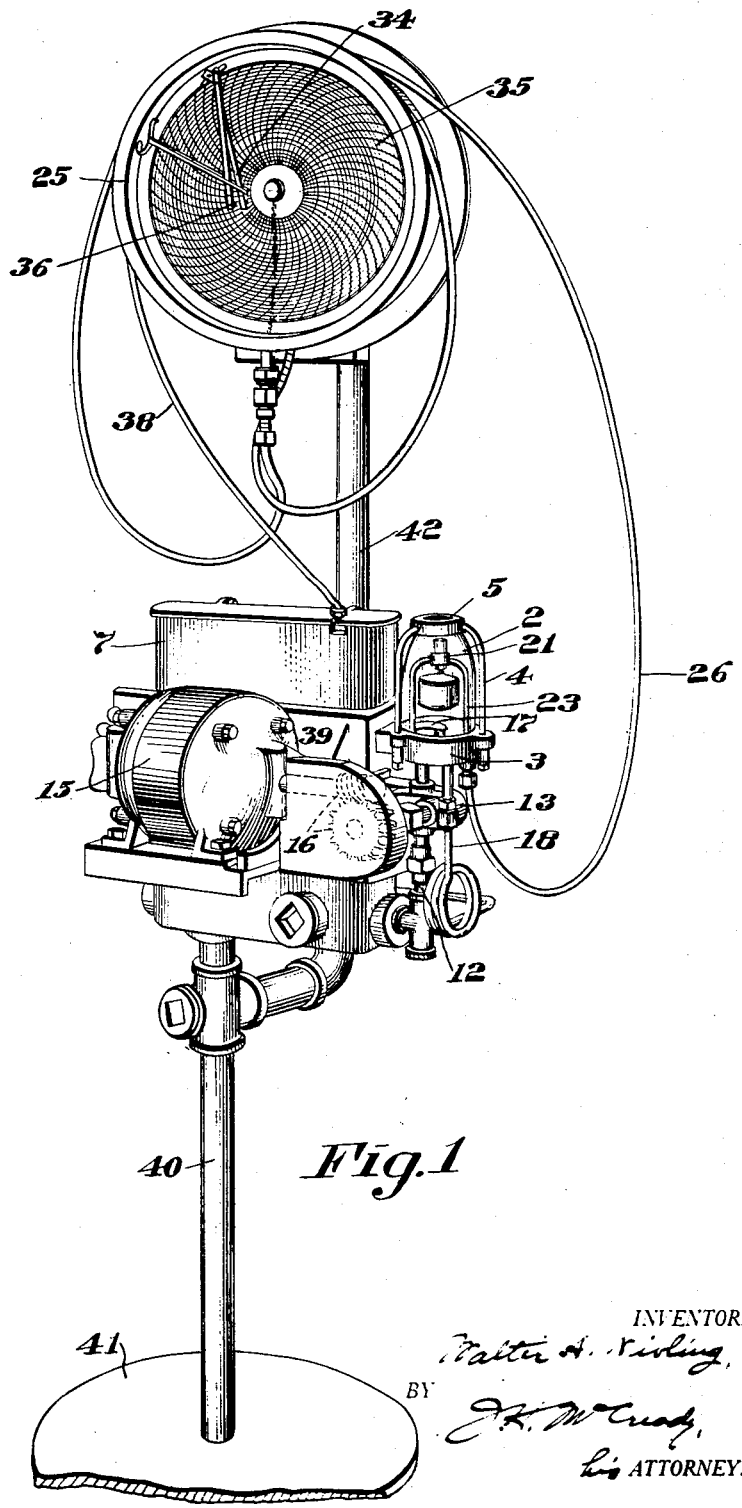
Figure 1 is a perspective view of a viscosimeter constructed in accordance with this invention.

The viscosimeter shown in the drawings, illustrating an embodiment of this invention, includes a trap or air chamber into which a stream of liquid under test is forced or driven at practically a constant rate by flow-producing means. This liquid is discharged from the trap through a tube or conductor having a bore sufficiently restricted to cause the liquid to back up in the trap and thereby confine a body of air therein. This air is under a pressure created by the liquid itself and this pressure tends to force the liquid out through the discharge tube or conductor. The shape and dimensions of this discharge conductor are fixed so that it offers a fixed resistance to the flow of liquid away from the trap in order to cause the liquid to produce a reaction pressure in advance of the resistance. Since the rate of flow of the liquid into the trap is constant, the rate of flow out of the trap also will be constant so long as the viscosity of the liquid remains constant. If, however, the viscosity should rise, the rate of discharge of liquid from the trap would be temporarily reduced due to the increased viscosity, thus raising the level of the liquid in the trap and thereby increasing the air pressure in the trap until it rises to such a point that it causes the rate of outflow to equal the rate of inflow. On the other hand, if the viscosity should fall, the rate of outflow would increase momentarily, the liquid level would recede, and the air pressure would drop until it again reached a point where the rate of outflow again equaled the rate of inflow. Bearing in mind the fact that the rate of inflow is constant, it will be evident that the pressure of the air confined in the trap will vary directly with its viscosity. Consequently, a meansurement of the variations in air pressure in the trap will give comparative indications of the viscosity of the liquid under test. Connected to the air chamber is a pressure indicating and recording device calibrated to indicate and record a range of viscosities. The reaction pressure set up by the liquid in advance of the resistance or conductor is thus imposed on the pressure responsive device, which is connected to the air chamber structure between the liquid inlet and the liquid outlet thereof, so that said pressure responsive device is caused to indicate and record the viscosity of the liquid.

Referring first to Figs. 1 and 2, the trap is shown at 2 and it consists of a glass bell mounted on a metal base 3, the lower edge of the bell being held against the base by curved rods 4 which connect the base with a metal cap 5 mounted on top of the bell. Preferably a gasket 6, Fig. 2, is interposed between the lower edge of the bell and the seat therefor in the base 3.

The liquid which is circulated through the trap 2 is taken from a supply tank 7 which is divided by a partition 8 and an adjustable wier 9 into two compartments 10 and 11, Fig. 2. This liquid flows into the chamber or compartment 10, over the upper edge of the wier 9 into the chamber 11 and out through a discharge pipe, the wier serving to maintain a constant level in the chamber 10. From this chamber the liquid flows through a pipe 12 to the intake end of a pump 13 which preferably is of the rotary type. A constant speed electric motor 15, Fig. 1, drives the pump through reduction gearing 16, and forces the liquid through the pipe 14, Fig. 2, at a substantially constant rate, into the trap 2. The liquid is delivered under a baffle 17, Figs. 2 and 4, circulates through the bottom of the trap, and flows out through the discharge pipe or conductor 18.

This conductor is so restricted that it creates a considerable back pressure in the trap 2, the liquid normally rising in the trap to, say, the dotted line 31, Fig. 2. In order to increase the back pressure, the conductor 18 may be coiled, as shown, it being understood that it may be necessary to change the conductor for liquids of different viscosities. The outlet or discharge end of the conductor is connected to the tank 7, as indicated in Fig. 2, this connection and that with the trap being made through unions so that the conductor can easily be disconnected and replaced by one of different shape or dimensions.

In order to indicate and record variations in air pressure in the trap 2, a standard pressure recorder 25 may conveniently be used, this recorder being connected by a flexible tube or pipe 26 with the trap. The tube 26 is joined by a union 27, Fig. 2, to the lower end of a tube 23 which, together with the two rods 22—22, supports a small casing 21 in the upper part of the trap. Air ducts are formed in the casing 21, one of these ducts opening into a valve seat 28 with which a valve plunger 29 cooperates. This plunger slides loosely through a hole formed in an inverted cap 24 which is screw threaded into the lower side of the casing 21. The valve also has a reduced extension 30 which slides loosely in a vertical duct in the part 21 and assists in guiding the valve. These parts afford ample communication between the trap 2 and the gage 25 to transmit variations in pressure in the air in the trap to the gage. If the discharge conduit 18, however, should become plugged or the viscosity should increase greatly for any reason, thus resulting in such an increase in air pressure in the trap that the recorder 25 might be damaged, the valve 29 then would close and thus protect the recorder 25. That is, if the viscosity of the liquid should increase greatly, the rate of flow through the conductor 18 would be reduced temporarily, the level of the liquid in the trap would rise, and the air pressure in the trap would be increased. Such a rise in the level of the liquid would lift the float 32 to which the valve plunger 29 is secured, thus moving the plunger up into its seat and shutting off communication between the trap 2 and the recorder 25. A pin 33, Fig. 3, projects transversely through the valve plunger 29 inside the cap 24 and limits the downward movement of the float 32.

In the recorder shown the right-hand pointer or pen 34, Fig. 1, gives both a visible indication of the variations in viscosity and also makes a permanent record on the chart 35.

Inasmuch as temperature has an important effect on viscosity, it is desirable to record the temperature of the liquid simultaneously and on the same chart with the viscosity record. For this purpose the recorder 25 is equipped with another pointer or pen 36 which records temperature, this pointer moving in response to changes in temperature of a thermo-sensitive unit 37, Fig. 2, which is submerged in the liquid in the chamber 10. A tube 38 connects this unit with the recorder 25.

The parts above described may be supported in any convenient manner. As shown in Fig. 1, the motor 15, trap base 3, and pump 13 are mounted on a bracket 39 which is secured to the tank 7, and the tank is supported by a vertical pipe or pedestal 40 rising from a base 41. Another pipe 42, which is connected with the pipe 40, supports the recorder 25.

Figure 5:
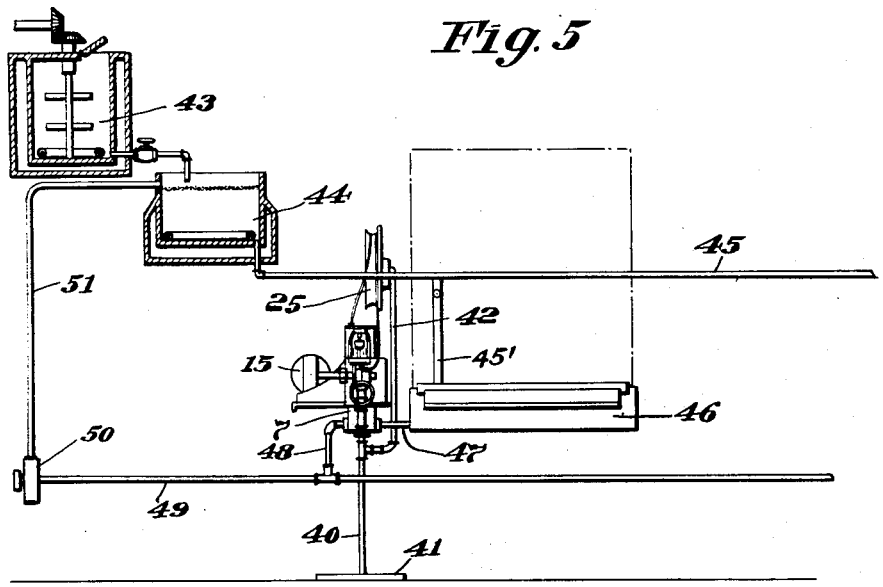
Fig. 5 is a diagrammatic view showing an organization in which the instrument is used.

Referring to Fig. 5 which shows one method of using the apparatus with a slasher, the sizing is mixed in the steam jacketed kettle 43 and is discharged into the storage tank 44. From this tank it flows through the pipe line 45 to the dip tanks of a series of slashers, one of these tanks being shown at 46 as connected with the pipe 45 by the branch pipe 45'. A pipe 47 connects the tank 46 with the constant level chamber 10 of the tank 7, so that the level of the liquid in the tank 46 will be controlled by the adjustable wier 9 in the tank 7. The sizing which overflows this wier into the chamber 11 is discharged through a pipe 48, Figs. 2 and 5, into a return pipe 49 which conducts the liquid back to a pump 50, this pump forcing the sizing through a pipe 51 into the storage tank 44 for recirculation. In Fig. 5 the instrument provided by this invention is shown somewhat exaggerated in size with reference to the parts 43, 44 and 46.

In operation the sizing flows continuously from the dip tank 46 of the slasher into the tank 7 where a constant level is maintained by the wier 9. The head of liquid so maintained preferably is nearly sufficient to flow the liquid into the trap. The pump 13 running at a constant speed forces the liquid at a substantially constant rate into the trap 2 notwithstanding changes in the viscosity of the liquid. This sizing finds its way through the discharge pipe or conductor 18 back into the constant level chamber 10 of the tank 7. As above stated, the conductor 18 is made of such dimensions and shape that it impedes the flow of sizing sufficiently to maintain a quantity of air constantly confined in the trap 2. If the viscosity of the liquid should increase, the level of liquid in the trap will rise due to the fact that its rate of flow through the conductor 18 is reduced or decreased momentarily. This will result in increasing the pressure on the air in the trap 2, the pressure rising until the original rate of outflow is restored. On the other hand, if the viscosity should become lower, the liquid level in the trap 2 will recede or drop, thus reducing the air pressure. These variations in pressure correspond directly to the variations in viscosity of the flowing liquid, so that the pressure curve made by the pointer 34 of the recorder 35 is in reality a viscosity curve.

Figure 6:
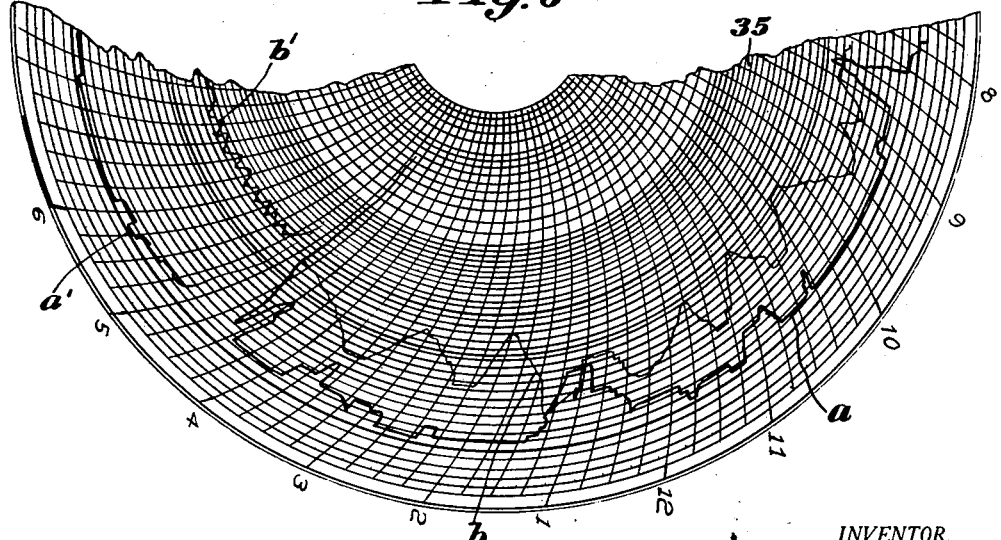
Fig. 6 is a plan view showing a portion of a chart used in the instrument.

In Fig. 6 temperature curves or records made by the pen or pointer 36 are indicated at $a$ and $a'$, while viscosity records are indicated at $b$ and $b'$. The records $a$ and $a'$ are somewhat abnormal, indicating rather wide variations both in temperature and viscosity, and a comparison of the two records shows that the changes in viscosity are not due merely to changes in temperature. The curve $b'$ is a more normal viscosity record, indicating a fairly uniform consistency of sizing.

It will thus be evident that the invention provides an instrument of a simple form for indicating or recording continuously changes in viscosity of the liquid under test. The instrument is very reliable in operation, and the liquid flowing through the trap is kept constantly in motion so that there is no opportunity for solid material carried in the stream to deposit and plug the instrument. The conductor 18 can easily be changed for liquids of different viscosities.

While I have herein shown and described the best embodiment of my invention that I have so far devised, it will be evident that the invention may be embodied in many other forms without departing from the spirit or scope thereof. For example, I have shown a pump for circulating the liquid under test through the trap, but it is evident that this circulation might be created by gravity or by other means. Also, in the instrument shown trapped air is utilized to transmit the pressure to the recording instrument, but it is evident that other fluids could be used, and the term "air" used in the appended claims is intended to include equivalent fluids.

While the instrument shown does not measure viscosity in poises, such a measurement usually being unnecessary, it is obvious that the instrument can be calibrated to indicate or record viscosity in poises or other appropriate units of measurement. It will be evident also that the instrument shown can be used to measure the viscosity of a batch or sample of liquid by placing such batch or sample in the tank 7 and circulating it in the manner above described, the instrument giving instantaneous and continuous viscosity readings.

Having thus described my invention, what I desire to claim as new is:

1. In a viscosimeter, the combination of an air trap, means for forcing the liquid under test into said trap at a substantially constant rate, a conductor through which the liquid is discharged from said trap, said conductor being adapted to impede the flow of liquid therethrough, whereby air confined in the trap will be under a pressure varying with the viscosity of said liquid, and means for indicating variations in the air pressure in said trap.

2. In a viscosimeter, the combination of an air trap, a pump for forcing the liquid under test into said trap, a conductor of fixed shape and dimensions through which the liquid is discharged from said trap, said conductor being adapted to restrict the flow of liquid therethrough, means for driving said pump at substantially a constant speed, whereby the air confined in the trap will be under a pressure varying with the viscosity of said liquid, and means for indicating variations in air pressure in said trap.

3. In a viscosimeter, the combination of an air trap, means including a constant level reservoir for forcing the liquid under test into said trap at substantially a constant rate, a conductor of fixed shape and dimensions through which the liquid is discharged from said trap, said conductor being adapted to restrict the flow of liquid therethrough, whereby the air confined in the trap will be under a pressure varying with the viscosity of said liquid, and means for indicating variations in air pressure in said trap.

4. In a viscosimeter, the combination of an air trap, a pump for forcing the liquid under test into said trap, a conductor of fixed shape and dimensions through which the liquid is discharged from said trap, said conductor being adapted to restrict the flow of liquid therethrough, means for driving said pump at substantially a constant speed, a reservoir from which said liquid is supplied to the pump, means for maintaining a substantially constant head of liquid in said reservoir, and means for indicating variations in air pressure in said trap.

5. In a viscosimeter, the combination of an air trap, means for forcing the liquid under test into said trap at substantially a constant rate, a conductor through which the liquid is discharged from said trap, said conductor being adapted to impede the flow of liquid therethrough, whereby air confined in the trap will be under a pressure varying with the viscosity of said liquid, an instrument connected with said trap for indicating variations in air pressure in the trap, a float in said trap, and a valve in the connection between said instrument and trap arranged to be operated by said float.

6. That improvement in methods of measuring variations in the viscosity of a stream of liquid which consists in causing said stream to trap a body of air, maintaining a substantially constant rate of flow of said liquid to said trapped body of air notwithstanding changes in the viscosity of said liquid, causing the flow of liquid from said body of air in such manner that the rate of said flow will vary with the changes in viscosity of the liquid, thereby creating in said body pressures changing with variations in the viscosity of said liquid, and continuously measuring the pressure in said body of air.

7. That improvement in methods of measuring variations in the viscosity of a stream of liquid which consists in causing said stream to trap a body of air and create pressure therein, maintaining a substantially constant rate of flow of liquid to said trapped body of air notwithstanding changes in the viscosity of said liquid, opposing a fixed resistance to the flow of said liquid away from said body of air, whereby the rate of such flow will vary with changes in viscosity of the liquid and the pressure created in said trapped body of air will vary correspondingly, and measuring continuously the pressure in said body of air.

8. That improvement in methods of measuring variations in the viscosity of a stream of liquid which consists in causing said stream to trap a body of air and create pressure in said body, maintaining a constant circulation of the liquid in contact with said body of air, utilizing said air pressure to force said liquid through a conductor of fixed shape and dimensions and adapted to impede the flow of the liquid therethrough, and measuring continuously the pressure in said trapped body of air.

9. In a viscosimeter, the combination of an air trap, means for forcing the liquid under test into said trap at substantially a constant rate, a conductor through which the liquid is discharged from said trap, said conductor being adapted to impede the flow of liquid therethorugh, whereby air confined in the trap will be under a pressure varying with the viscosity of said liquid, and recording apparatus including means responsive to variations in air pressure in said trap and means for recording said variations on a chart, said recording apparatus also including means responsive to variations in changes in temperature of the liquid under test, and means for recording such temperature variations on said chart.

10. That improvement in methods of measuring variations in the viscosity of a stream of liquid which consists in forcing said liquid at a substantially constant rate into a chamber in which a body of air is entrapped by the liquid and thence through a conductor of fixed shape and dimensions and adapted to impede the flow of liquid therethrough, and measuring variations of the pressure in said entrapped body of air.

11. Apparatus for measuring the viscosity of a liquid, comprising, flow producing means for causing a definite flow of a liquid, a conductor for the liquid connected to said flow producing means and adapted to retard the liquid flow therethrough in order to produce a reaction pressure in the liquid in advance of said conductor, an air chamber connected between said flow producing means and said conductor and subject to the reaction of the liquid in advance of said conductor, and a pressure responsive measuring device calibrated to indicate a range of viscosities and connected with said air chamber.

12. Apparatus for measuring the viscosity of a liquid, comprising a conductor adapted to impose a resistance to a liquid flow, means for positively driving the liquid at a constant rate of flow through said conductor, said conductor being adapted to retard the flow therethrough in order to produce a reaction pressure in the liquid in advance of the conductor, a pressure responsive measuring device calibrated to indicate a range of viscosities, and means establishing communication between said pressure responsive measuring device and said first named means in advance of said conductor in order to subject said pressure responsive measuring device to the reaction pressure of the liquid in advance of said conductor.

13. The method of measuring the viscosity of a liquid comprising the steps of producing a flow of the liquid to be tested in a confined stream and at a predetermined rate notwithstanding changes in its viscosity, imposing a definite resistance on the flow of said liquid in order to cause the liquid to produce a reaction pressure at a point in advance of said resistance and to cause said reaction pressure to vary due to changes in viscosity of the liquid, and measuring the reaction pressure so produced to indicate a range of viscosities.

14. Apparatus for measuring the viscosity of a liquid, comprising a structure having an inlet and an outlet, a conductor connected to said outlet and adapted to offer resistance to the liquid flow, means for delivering liquid to said inlet under pressure and at a constant rate notwithstanding variations in the viscosity of said liquid, said structure, conductor and means serving to confine the stream of liquid flowing through them but permitting variations in the pressure on the liquid flowing through said structure due to variations in the viscosity of said liquid, and a pressure responsive gage calibrated to indicate a range of viscosities and connected to said structure between said inlet and said outlet to cause said gage to indicate the fluid pressure in said structure in advance of said outlet.

15. Apparatus for measuring the viscosity of a liquid, comprising means for conducting and confining a stream of liquid, the viscosity of which is to be measured, flow producing means for causing a predetermined rate of flow of said liquid through said liquid conducting means notwithstanding variations in the viscosity of the liquid, the first mentioned means including a liquid conducting element adapted to retard the liquid flow therethrough in order to produce a reaction pressure in the liquid in advance of said element, a pressure responsive measuring device calibrated to indicate a range of viscosities, and means operatively connecting said device to said conducting means between said flow producing means and said element and adapted so to impose said reaction pressure on said measuring device as to cause said device to respond to the changes in said reaction pressure.

16. Apparatus for measuring the viscosity of a liquid, comprising flow producing means for causing a flow of a liquid at a constant rate notwithstanding variations in the viscosity of the liquid, means connected with said flow producing means for conducting said liquid in a confined stream, the latter means including a conducting element adapted to retard the liquid flow therethrough in order to produce in the liquid in advance of said element a reaction pressure varying with changes in viscosity of the liquid, a pressure responsive device calibrated to indicate a range of viscosities, and means connecting said device to said conducting means between said flow producing means and said element and adapted so to impose said reaction pressure on said measuring device as to cause said device to respond to the changes in said reaction pressure.

WALTER A. NIVLING.